3,658,951
SULFONYLHYDRAZIDE PHOSPHONATES
John E. Herweh, Lancaster, Pa., assignor to
Armstrong Cork Company, Lancaster, Pa.
No Drawing. Filed Aug. 5, 1969, Ser. No. 847,715
Int. Cl. C07f 9/40
U.S. Cl. 260—923                                3 Claims

ABSTRACT OF THE DISCLOSURE

Phosphorus-containing sulfonylhydrazides of the formula:

In addition chlorosulfonated phosphorus-containing compounds useful as organic intermediates in the preparation of the hydrazides are described. The phosphorus-containing sulfonyl-hydrazides are useful as blowing agents for resinous blends.

BACKGROUND OF THE INVENTION

Field of the invention

The invention relates to phosphorus-containing sulfonylhydrazides useful as blowing agents.

Description of the prior art

Sulfonylhydrazides have been found useful as blowing agents and a class of phosphorus-containing sulfonylhydrazides is disclosed in Herweh et al. U.S. Patent 3,423,485.

BRIEF SUMMARY OF THE INVENTION

This invention relates to a novel class of compounds represented by the formula:

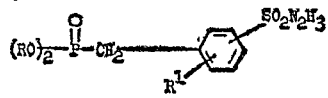

and a class of intermediate compounds represented by the formula:

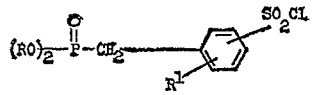

In these formulas, R may be lower alkyl such as methyl and ethyl; $R^1$ may be halogen, $NO_2$, lower alkyl, and H.

The phosphorus-containing sulfonylhydrazides are particularly useful as blowing agents for resinous blends and the phosphorus-containing blowing agents of this invention have the capability of imparting fire retardancy to the extent they are incorporated in resinous foams.

DESCRIPTION OF THE PREFERRED EMBODIMENTS

Dialkyl benzylphosphonates of the formula:

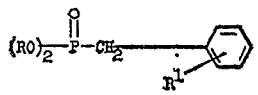

are reacted with chlorosulfonic acid to form the chlorosulfonated derivative and this is reacted with hydrazine to form the hydrazide.

In the formula R may be lower alkyl such as methyl and ethyl and $R^1$ may be halogen, $NO_2$, lower alkyl such as methyl and ethyl, and H. Examples of dialkyl benzylphosphonates useful as starting reactants are dimethyl benzylphosphonate, diethyl benzylphosphonate and substituted dialkyl benzylphosphonates such as dimethyl (methylphenyl) methylene phosphonate, diethyl (nitrophenyl) methylene phosphonate, and dimethyl (chlorophenyl) methylene phosphonate.

The compounds of this invention are formed by initially chlorosulfonating dialkyl benzylphosphonates or substituted dialkyl benzylphosphonates by adding the phosphonate to excess chlorosulfonic acid at room temperature. The crude chlorosulfonated phosphonates are obtained as chloroform soluble oils upon quenching the reaction mixture by addition to a mixture of ice and an organic solvent such as chloroform.

The chlorosulfonated derivatives are then reacted with hydrazine by adding hydrazine to a solution of the chlorosulfonated phosphorus ester in a polar solvent such as tetrahydrofuran or acetonitrile. The addition is made with stirring at low temperature 0°±5° C. and, upon completion of the addition, the stirred solution is allowed to warm to room temperature. Usually a 5% to 10% molar excess of hydrazine is employed, two moles of hydrazine per mole of sulfonyl chloride being required to complete the reaction.

EXAMPLE 1

Preparation of dimethyl p-chlorosulfonyl-benzylphosphonate

Dimethyl benzylphosphonate (40 grams 0.2 mole) was added dropwise in ⅔ hour to stirred chlorosulfonic acid (233 grams, 2.0 mole) at 25° C. The reaction mixture was heated to 50° C. and maintained at this temperature for 6 hours. The cooled reaction mixture was quenched by addition to ice and chloroform. The two phases were separated, the chloroform layer washed with 5% sodium bicarbonate and saturated salt and dried over magnesium sulfate. Distillation of the dried, clear and colorless chloroform layer at reduced pressure left 46 grams (77%) of crude chlorosulfonated phosphonate.

Analysis.—Calculated for $C_9H_{12}ClO_5PS$ (percent): P, 10.4; S, 10.7. Found (percent): P, 10.5; S, 11.0.

EXAMPLE 2

Preparation of dimethyl p-hydrazidosulfonyl-benzylphosphonate

To the crude chlorosulfonated dimethyl benzylphosphonate of Example 1 (24 grams 0.08 mole) in 100 ml. of tetrahydrofuran was added in 20 minutes with stirring 85% hydrazine (7 grams, 0.186 mole). Reaction temperatures were maintained at 0° ±5° C. during the addition. The two phase reaction mixture (clear, colorless solvent layer and white solid) was stirred at 0° C. for 2 hours and left to warm to room temperature. The white solid precipitate was filtered and washed consecutively with fresh tetrahydrofuran and ether. The dried filtercake (23.8 grams) was washed with cold water to remove hydrazine hydrochloride; the aqueous insoluble white solid (16.6 grams after drying) melted at 130–132° C. with decomposition.

The tetrahydrofuran filtrate was distilled under reduced pressure and left 4 grams of additional product. The combined crops of crude product (20.6 grams) recrystallized several times, gave a white sulfonylhydrazide (M.P. 142–144° dec.).

Analysis.—Calculated for $C_9H_{15}N_2O_5PS$ (percent): C, 36.7; H, 5.1; N, 9.5; P, 10.5; S, 10.9. Found (percent): C, 36.9; H, 5.2; N, 9.4; P, 10.5; S, 10.9.

EXAMPLE 3

Preparation of diethyl p-chlorosulfonylbenzylphosphonate

Chlorosulfonic acid (349.5 grams, 3.0 mole) and diethyl benzylphosphonate (68.5 grams, 0.3 mole) were reacted in accordance with the procedure of Example 1. Workup of the reaction mixture in accordance with the procedure of Example 1 gave 80.7 grams (82%) of the crude chlorosulphonated product.

EXAMPLE 4

Preparation of diethyl p-hydrazidosulfonylbenzylphosphonate

Aqueous 85% hydrazine (7.2 grams, 0.19 mole) was added dropwise in 20 minutes with stirring to a solution of crude chlorosulfonated diethyl benzylphosphonate (29.5 grams, 0.09 mole) in 100 milliliters of tetrahydrofuran maintained at −5 to 0° C. Upon completing the addition, the reaction mixture was worked up in accordance with the procedure of Example 2. Hydrazine sulfate (9.3 grams) and crude sulfonylhydrazide (18.4 grams, M.P. 126° to 128° C. dec.) were obtained. Two recrystallizations of the crude sulfonylhydrazide from absolute ethyl alcohol raised the melting point to 130.5 to 132° C. with decomposition.

*Analysis.*—Calculated for $C_{11}H_{19}N_2O_5PS$ (percent): C, 41.0; H, 5.9; N, 8.7; P, 9.0; S, 10.0. Found (percent): C, 40.9; H, 6.1; N, 8.9; P, 9.9; S, 10.0.

Sulfonylhydrazides prepared from the chlorosulfonated dialkyl benzylphosphonates are useful as blowing agents for resinous blends. Thermal decomposition (Table I) of the sulfonylhydrazides yields nitrogen, water and phosphorus-containing residue. The latter may function as a fire retardant in the resulting foamed plastic.

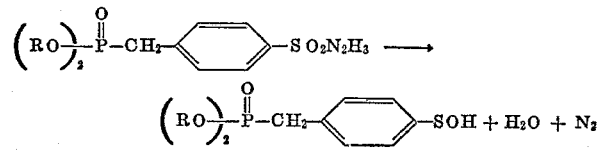

TABLE I.—THERMAL DECOMPOSITION OF SULFONYLHYDRAZIDES IN NUJOL

| R= | Dec. temp., °C. | Ml. of gas per m mole of sulfonylhydrazide at infinite time | Gas yield, percent |
|---|---|---|---|
| CH₃ | 129.5 | 16.3 | 73 |
| CH₃CH₂ | 129.5 | 21.2 | 95 |

EXAMPLE 5

Free-flowing particles (dry blend) of plasticized thermoplastic vinyl resin were formed by mixing a masterbatch of the following composition in a Henschel Blender at a temperature below about 200° F.

Ingredient: Parts (grams)
- Polyvinyl chloride homopolymer having a number average molecular weight of 26,000 and a weight average of 54,000 (determined by gel permeation chromatography) ----- 1,000
- Dioctyl phthalate ---------------------- 700
- Epoxidized soybean oil ---------------- 50
- Liquid Ca-Zn octoate stabilizer -------- 40
- 50-mesh limestone --------------------- 100
- TiO₂ pigment -------------------------- 20
- Calcium silicate ----------------------- 7.5

The master-batch was prepared by blending the ingredients in a small Henschel Mixer. Initially the pigment was added to the polyvinyl chloride homopolymer and the mixture was blended at a slow speed for one minute.

Following this one half of the dioctyl phthalate and all of the epoxidized soybean oil was added and blended at high speed until the temperature of the mix reached 165° F. At this temperature, the remaining dioctyl phthalate and all of the stabilizer were added and blending was continued until the temperature reached 175° F. At 175° F. 3% by weight, based on the weight of the formulation, of dimethyl p-hydrazidosulfonylbenzylphosphonate was added and the mix blended at a slow speed until a temperature of 200° F. was attained. The mix was then cooled to 80° F. by addition of Dry Ice at slow speeds and finally the calcium silicate was added and blended and blending continued for ¾ of a minute.

Using a portion of the dry blend, prepared as described above, the dry blend was laid up to a thickness of 120 mils on a rubber bonded asbestos fiber felt 0.039 inch thick. The sample thus prepared was then placed between two heated platens and held for 60 seconds after which the fused sheet that formed was cooled and stripped from the felt and examined. During fusion the top platen was maintained at a temperature of 1020° F. and the bottom platen was maintained at a temperature of 420° F.

The foam polyvinyl chloride resin sheet thus prepared had an average density of 23.3 pounds per cubic foot and had a rough surface with a coarse texture.

The preferred percentage range for blowing agents is between about 1% to 5% by weight, based on the organic resin component.

I claim:
1. The compound of the formula:

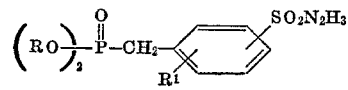

wherein R is lower alkyl, and $R^1$ is selected from the group consisting of chlorine, $NO_2$, lower alkyl and H.

2. The compound of claim 1 wherein R is methyl and $R^1$ is H.

3. The compound of claim 1 wherein R is ethyl and $R^1$ is H.

References Cited
UNITED STATES PATENTS
3,423,485  1/1969  Herweh et al. _____ 260—923

JOSEPH REBOLD, Primary Examiner
R. L. RAYMOND, Assistant Examiner

U.S. Cl. X.R.
260—2.5 P, 947, 968